US008367765B2

(12) United States Patent
Ito et al.

(10) Patent No.: US 8,367,765 B2
(45) Date of Patent: *Feb. 5, 2013

(54) CONJUGATED DIENE-BASED POLYMER, CONJUGATED DIENE-BASED POLYMER COMPOSITION, AND PROCESS FOR PRODUCING CONJUGATED DIENE-BASED POLYMER

(75) Inventors: Mana Ito, Ichihara (JP); Katsunari Inagaki, Ichihara (JP); Mayumi Oshima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,167

(22) Filed: Aug. 9, 2011

(65) Prior Publication Data

US 2012/0041135 A1 Feb. 16, 2012

(30) Foreign Application Priority Data

Aug. 11, 2010 (JP) ................................. 2010-180022
Mar. 7, 2011 (JP) ................................. 2011-048587

(51) Int. Cl.
C08L 43/04 (2006.01)
C08F 230/08 (2006.01)
C08F 36/04 (2006.01)

(52) U.S. Cl. ........................ 524/547; 526/258; 526/279

(58) Field of Classification Search ........................ None
See application file for complete search history.

(56) References Cited

U.S. PATENT DOCUMENTS

| 3,485,857 | A | * | 12/1969 | Speier | 556/12 |
| 3,504,007 | A | * | 3/1970 | Owen et al. | 556/413 |
| 3,853,994 | A | * | 12/1974 | Barcza | 514/63 |
| 3,900,679 | A | * | 8/1975 | Marzocchi | 428/378 |
| 4,183,844 | A | * | 1/1980 | Streck et al. | 523/209 |
| 4,396,751 | A | * | 8/1983 | Kampf et al. | 526/279 |
| 4,894,409 | A | * | 1/1990 | Shimada et al. | 524/492 |
| 5,128,416 | A | * | 7/1992 | Imai et al. | 525/254 |
| 5,189,109 | A | * | 2/1993 | Imai et al. | 525/296 |
| 5,459,205 | A | * | 10/1995 | Furukawa et al. | 525/446 |
| 5,508,333 | A | * | 4/1996 | Shimizu | 524/424 |
| 5,821,290 | A | * | 10/1998 | Labauze | 524/188 |
| 6,627,721 | B1 | * | 9/2003 | Rodewald et al. | 526/338 |
| 7,041,761 | B2 | * | 5/2006 | Halasa et al. | 526/279 |
| 7,342,070 | B2 | * | 3/2008 | Tsukimawashi et al. | 525/105 |
| 2005/0203251 | A1 | * | 9/2005 | Oshima et al. | 525/192 |
| 2006/0004143 | A1 | * | 1/2006 | Inagaki et al. | 525/192 |
| 2007/0088132 | A1 | * | 4/2007 | Taniguchi et al. | 525/342 |
| 2008/0289740 | A1 | * | 11/2008 | Mori et al. | 152/450 |
| 2008/0319151 | A1 | * | 12/2008 | Oshima | 528/14 |
| 2009/0163668 | A1 | * | 6/2009 | Yamada et al. | 525/331.9 |
| 2009/0203826 | A1 | * | 8/2009 | Rachita et al. | 524/445 |
| 2009/0203843 | A1 | * | 8/2009 | Fukuoka et al. | 525/105 |
| 2009/0247692 | A1 | * | 10/2009 | Oshima et al. | 524/547 |
| 2010/0056713 | A1 | * | 3/2010 | Oshima | 524/572 |
| 2010/0317852 | A1 | * | 12/2010 | Tonomura et al. | 544/229 |
| 2011/0082251 | A1 | * | 4/2011 | Oshima | 524/547 |
| 2011/0237737 | A1 | * | 9/2011 | Fujii et al. | 524/526 |
| 2011/0245407 | A1 | * | 10/2011 | Ito et al. | 524/547 |
| 2011/0275755 | A1 | * | 11/2011 | Oshima et al. | 524/548 |

FOREIGN PATENT DOCUMENTS

| EP | 0334042 A | 9/1989 |
| JP | 1-217011 A | 8/1989 |
| JP | 07-082422 A | 3/1995 |

* cited by examiner

Primary Examiner — Robert S Loewe
(74) Attorney, Agent, or Firm — Sughrue Mion, PLLC

(57) ABSTRACT

Disclosed are a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer. There is provided a conjugated diene-based polymer having a conjugated diene unit, a monomer unit based on a compound represented by the following formula (1) and a monomer unit based on a compound represented by the following formula (2).

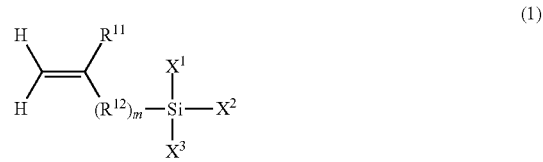

(1)

wherein $R^{11}$ represents a hydrogen atom or a hydrocarbyl group, m is 0 or 1, $R^{12}$ represents a hydrocarbylene group, and $X^1$, $X^2$ and $X^3$ each independently represent a substituted amino group, or a hydrocarbyl group optionally having a substituent, provided that at least one of $X^1$, $X^2$ and $X^3$ is a substituted amino group.

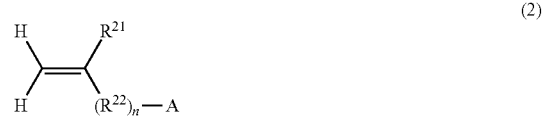

(2)

wherein $R^{21}$ represents a hydrogen atom or a hydrocarbyl group, n is 0 or 1, $R^{22}$ represents a hydrocarbylene group, and A represents a substituted amino group, or a nitrogen-containing heterocyclic group.

10 Claims, No Drawings

CONJUGATED DIENE-BASED POLYMER, CONJUGATED DIENE-BASED POLYMER COMPOSITION, AND PROCESS FOR PRODUCING CONJUGATED DIENE-BASED POLYMER

The present invention relates to a conjugated diene-based polymer, a conjugated diene-based polymer composition, and a process for producing a conjugated diene-based polymer.

BACKGROUND OF THE INVENTION

As a rubber composition for an automobile tire, a rubber composition containing a conjugated diene-based polymer such as polybutadiene or a butadiene-styrene copolymer and a reinforcing agent is used.

In recent years, with increased concern about an environmental problem, requirements of fuel cost-saving properties on an automobile have been increasing, and a rubber composition used in a tire for an automobile has also been required to be excellent in fuel cost-saving properties.

For example, as a polymer which enhances fuel cost-saving properties and a polymer composition favorable in fuel cost-saving properties, JP-A 7-82422 has proposed a polymer obtained by living anion polymerization of butadiene, styrene, and dimethylaminomethylstyrene using alkyllithium as a polymerization initiator, and a polymer composition containing the polymer and carbon black. JP-A 1-217011 has proposed a conjugated diene-based polymer in which one end of a polymer obtained by copolymerization of butadiene and styrene using alkyllithium as a polymerization initiator is modified with bis(dimethylamino)methylvinylsilane, and a polymer composition of the polymer and carbon black.

SUMMARY OF THE INVENTION

However, polymer compositions using the above conventional conjugated diene-based polymer were not necessarily sufficiently satisfactory in fuel cost-saving properties and elongation at break.

Under such circumstances, an object of the present invention is to provide a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer.

A first aspect of the present invention relates to a conjugated diene-based polymer having a monomer unit based on a conjugated diene, a monomer unit based on a compound represented by the following formula (1) and a monomer unit based on a compound represented by the following formula (2).

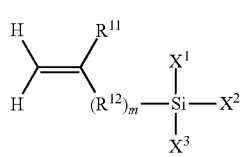

(1)

wherein $R^{11}$ represents a hydrogen atom or a hydrocarbyl group, m is an integer of 0 or 1, $R^{12}$ represents a hydrocarbylene group, and $X^1$, $X^2$ and $X^3$ each independently represent a substituted amino group, or a hydrocarbyl group optionally having a substituent, provided that at least one of $X^1$, $X^2$ and $X^3$ is a substituted amino group.

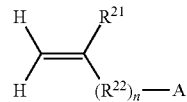

(2)

wherein $R^{21}$ represents a hydrogen atom or a hydrocarbyl group, n is an integer of 0 or 1, $R^{22}$ represents a hydrocarbylene group, and A represents a substituted amino group, or a nitrogen-containing heterocyclic group.

A second aspect of the present invention relates to a conjugated diene-based polymer composition comprising the conjugated diene-based polymer and a reinforcing agent.

A third aspect of the present invention relates to a process for producing a conjugated diene-based polymer comprising polymerizing a monomer component containing a conjugated diene, a compound represented by the above formula (1) and a compound represented by the above formula (2) with an alkali metal catalyst in a hydrocarbon solvent.

According to the present invention, there can be provided a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer.

DETAILED DESCRIPTION OF THE INVENTION

The conjugated diene-based polymer of the present invention is a conjugated diene-based polymer having a monomer unit based on a conjugated diene, a monomer unit based on a compound represented by the following formula (1), and a monomer unit based on a compound represented by the following formula (2).

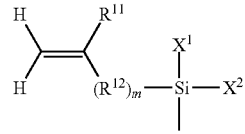

(1)

wherein $R^{11}$ represents a hydrogen atom or a hydrocarbyl group, m is an integer of 0 or 1, $R^{12}$ represents a hydrocarbylene group, and $X^1$, $X^2$ and $X^3$ each independently represent a substituted amino group, or a hydrocarbyl group optionally having a substituent, provided that at least one of $X^1$, $X^2$ and $X^3$ is a substituted amino group.

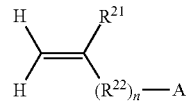

(2)

wherein $R^{21}$ represents a hydrogen atom or a hydrocarbyl group, n is an integer of 0 or 1, $R^{22}$ represents a hydrocarbylene group, and A represents a substituted amino group, or a nitrogen-containing heterocyclic group.

Herein, the hydrocarbyl group represents a hydrocarbon residue. The hydrocarbylene group represents a divalent hydrocarbon residue. The nitrogen-containing heterocyclic group represents a group obtained by removing one hydrogen atom from a carbon atom of a heterocyclic ring of a compound having a nitrogen-containing hetrocyclic ring, and the nitrogen-containing heterocyclic ring represents a heterocyclic ring having a nitrogen atom as a heteroatom constituting a ring.

Examples of the conjugated diene include 1,3-butadiene, isoprene, 1,3-pentadiene, 2,3-dimethyl-1,3-butadiene, and 1,3-hexadiene, and one or more kinds of them are used. The conjugated diene is preferably 1,3-butadiene, or isoprene.

$R^{11}$ in the formula (1) represents a hydrogen atom or a hydrocarbyl group.

Examples of the hydrocarbyl group of $R^{11}$ include an alkyl group and an alkenyl group. Examples of the alkyl group include a methyl group, an ethyl group, a n-propyl group, an isopropyl group, a n-butyl group, a sec-butyl group, and a tert-butyl group. Preferable is a methyl group.

Examples of the alkenyl group include a vinyl group, an allyl group, a 1-propenyl group, and a 1-methylethenyl group. Preferable is a vinyl group.

$R^{11}$ is preferably a hydrogen atom, a methyl group, or a vinyl group.

Examples of the hydrocarbylene group of $R^{12}$ include an alkylene group, an arylene group, and a group in which an arylene group and an alkylene group are bonded.

Examples of the alkylene group include a methylene group, an ethylene group, and a trimethylene group. Preferable is a methylene group or an ethylene group.

Examples of the arylene group include a phenylene group, a naphthylene group, and a biphenylene group. Preferable is a phenylene group.

Examples of the group in which an arylene group and an alkylene group are bonded include a group in which a phenylene group and an alkylene group are bonded, a group in which a naphthylene group and an alkylene group are bonded, and a group in which a biphenylene group and an alkylene group are bonded.

In addition, it is preferable that the group in which an arylene group and an alkylene group are bonded is such that a carbon atom of the alkylene group is bonded to the silicon atom in the formula (1).

Examples of the group in which a phenylene group and an alkylene group are bonded (phenylene-alkylene group) include a para-phenylene-alkylene group (e.g., a group represented by the following formula (1a)), a meta-phenylene-alkylene group (e.g., a group represented by the following formula (1b)), and an ortho-phenylene-alkylene group (e.g., a group represented by the following formula (1c)).

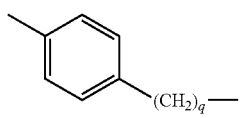

(1a)

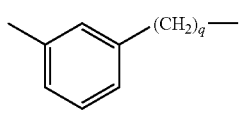

(1b)

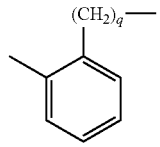

(1c)

wherein q represents an integer of 1 to 10.

The group in which an arylene group and an alkylene group are bonded is preferably a group in which a phenylene group and an alkylene group are bonded, more preferably a group represented by the above formula (1a), or a group represented by the above formula (1b), further preferably a para-phenylene-methylene group (a group represented by the formula (1a) in which q=1), a meta-phenylene-methylene group (a group represented by the formula (1b) in which q=1), a para-phenylene-ethylene group (a group represented by the formula (1a) in which q=2), or a meta-phenylene-ethylene group (a group represented by the formula (1b) in which q=2).

When $R^{11}$ is a hydrogen atom or a methyl group and m is 1, $R^{12}$ is preferably a group in which an arylene group and an alkylene group are bonded, or an arylene group, more preferably a group in which a phenylene group and an alkylene group are bonded, or a phenylene group, further preferably a phenylene group.

When $R^{11}$ is a vinyl group and m is 1, $R^{12}$ is preferably an alkylene group, more preferably a methylene group or an ethylene group.

In the formula (1), preferably, $R^{11}$ is a hydrogen atom and m is 0.

Examples of the hydrocarbyl group optionally having a substituent of $X^1$, $X^2$ and $X^3$ include hydrocarbyl groups optionally having an oxygen atom, a nitrogen atom and a silicon atom.

Examples of the hydrocarbyl group of $X^1$, $X^2$ and $X^3$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group and a propargyl group. Examples of the aryl group include a phenyl group, a tolyl group, and a xylyl group. Examples of the aralkyl group include a benzyl group. Examples of the hydrocarbyl group preferably include an alkyl group.

Examples of the hydrocarbyl group having an oxygen atom of $X^1$, $X^2$ and $X^3$ include alkoxyalkyl groups such as a methoxymethyl group, a methoxyethyl group, an ethoxymethyl group, and an ethoxyethyl group.

Examples of the hydrocarbyl group having a nitrogen atom of $X^1$, $X^2$ and $X^3$ include dialkylaminoalkyl groups such as a dimethylaminomethyl group, a dimethylaminoethyl group, a diethylaminoethyl group, and a diethylaminoethyl group.

Examples of the hydrocarbyl group having a silicon atom of $X^1$, $X^2$ and $X^3$ include trialkylsilylalkyl groups such as a trimethylsilylmethyl group, a trimethylsilylethyl group, a triethylsilylmethyl group, and a triethylsilylethyl group.

The hydrocarbyl group optionally having a substituent of $X^1$, $X^2$ and $X^3$ has preferably 1 to 10, more preferably 1 to 4 carbon atoms.

The hydrocarbyl group optionally having a substituent of $X^1$, $X^2$ and $X^3$ is preferably an alkyl group or an alkoxyalkyl group. The alkyl group is preferably an alkyl group having 1 to 4 carbon atoms, more preferably a methyl group or an ethyl group. The alkoxyalkyl group is preferably an alkoxyalkyl group having 2 to 4 carbon atoms.

The substituted amino group of $X^1$, $X^2$ and $X^3$ is preferably a group represented by the following formula (1-X).

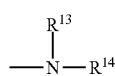

(1-X)

wherein $R^{13}$ and $R^{14}$ each represent a hydrocarbyl group, or a trihydrocarbylsilyl group, or $R^{13}$ and $R^{14}$ are bonded to represent a hydrocarbylene group optionally having a nitrogen atom and/or an oxygen atom as a hetero atom, or $R^{13}$ and $R^{14}$ are one group, and represent a group which bonds to a nitrogen atom with a double bond.

Examples of the hydrocarbyl group of $R^{13}$ and $R^{14}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an alkyl group, a 1-propenyl group, and a 1-methylethenyl group. Examples of the alkynyl group include an ethynyl group and a propargyl group. Examples of the aryl group include a phenyl group, a tolyl group, and a xylyl group. Examples of the aralkyl group include a benzyl group.

The hydrocarbyl group of $R^{13}$ and $R^{14}$ has preferably 1 to 10, more preferably 1 to 4, further preferably 1 to 2 carbon atoms.

The hydrocarbyl group of $R^{13}$ and $R^{14}$ is preferably an alkyl group, more preferably a linear alkyl group.

Examples of the trihydrocarbylsilyl group of $R^{13}$ and $R^{14}$ include trialkylsilyl groups such as a trimethylsilyl group, a triethylsilyl group, a triisopropylsilyl group, and a tert-butyldimethylsilyl group.

The trihydrocarbylsilyl group of $R^{13}$ and $R^{14}$ is preferably a trialkylsilyl group having 3 to 9 carbon atoms, more preferably a trialkylsilyl group in which an alkyl group bonded to a silicon atom is an alkyl group having 1 to 3 carbon atoms, further preferably a trimethylsilyl group.

Examples of the hydrocarbylene group optionally having a nitrogen atom and/or an oxygen atom as a hetero atom in which $R^{13}$ and $R^{14}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —CH$_2$CH$_2$—NH—CH$_2$—, a group represented by —CH$_2$CH$_2$—N=CH—, a group represented by —CH=CH—N=CH—, and a group represented by —CH$_2$CH$_2$—NH—CH$_2$CH$_2$—. Examples of the hydrocarbylene group having an oxygen atom include a group represented by —CH$_2$CH$_2$—O—CH$_2$CH$_2$—.

The group in which $R^{13}$ and $R^{14}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{13}$ and $R^{14}$ are bonded is preferably a hydrocarbylene group, more preferably an alkylene group, further preferably a polymethylene group.

Examples of one group in which $R^{13}$ and $R^{14}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{13}$ and $R^{14}$ bond to a nitrogen atom with a double bond has preferably 2 to 20, more preferably 2 to 6 carbon atoms.

$R^{13}$ and $R^{14}$ are preferably an alkyl group, a trialkylsilyl group, or an alkylene group in which $R^{13}$ and $R^{14}$ are bonded, more preferably an alkyl group.

Examples of the group represented by the formula (1-X) include a non-cyclic amino group and a cyclic amino group.

Examples of the non-cyclic amino group include a dialkylamino group and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl) amino group, a di(tert-butyl)amino group, and an ethylmethylamino group. Examples of the bis(trialkylsilyl)amino group include a bis(trimethylsilyl)amino group and a bis(t-butyldimethylsilyl)amino group.

Examples of the non-cyclic amino group include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino group include 1-polymethyleneimino groups such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, and a 1-dodecamethyleneimino group. In addition, examples thereof include a 1-pyrrolyl group, a 1-pyrazolidinyl group, a 1-imidazolidinyl group, a 1-pyrazolyl group, a 1-imidazolyl group, a 4,5-dihydro-1-imidazolyl group, a 1-piperazinyl group, and a morpholino group.

The group represented by the formula (1-X) is preferably a non-cyclic amino group, more preferably a dialkylamino group. The dialkylamino group is preferably a dimethylamino group, a diethylamino group, a di(n-propyl)amino group, or a di(n-butyl)amino group, more preferably a dimethylamino group, or a diethylamino group.

At least one of $X^1$, $X^2$ and $X^3$ in the formula (1) is a substituted amino group, preferably two or more of $X^1$, $X^2$ and $X^3$ are substituted amino groups, more preferably, two of $X^1$, $X^2$ and $X^3$ are substituted amino groups.

Examples of the compound represented by the formula (1) in which $R^{11}$ is a hydrogen atom and one of $X^1$, $X^2$ and $X^3$ is a dialkylamino group include the following compounds.
Compounds in which m is 0:
(dimethylamino)dimethylvinylsilane,
(diethylamino)dimethylvinylsilane,
(di-n-propylamino)dimethylvinylsilane,
(di-n-butylamino)dimethylvinylsilane,
(dimethylamino)diethylvinylsilane,
(diethylamino)diethylvinylsilane,
(di-n-propylamino)diethylvinylsilane,
(di-n-butylamino)diethylvinylsilane.
Compounds in which m is 1
(dimethylamino)dimethyl-4-vinylphenylsilane,
(dimethylamino)dimethyl-3-vinylphenylsilane,
(diethylamino)dimethyl-4-vinylphenylsilane,
(diethylamino)dimethyl-3-vinylphenylsilane,
(di-n-propylamino)dimethyl-4-vinylphenylsilane,
(di-n-propylamino)dimethyl-3-vinylphenylsilane,
(di-n-butylamino)dimethyl-4-vinylphenylsilane, (di-n-butylamino)dimethyl-3-vinylphenylsilane,
(dimethylamino)diethyl-4-vinylphenylsilane,
(dimethylamino)diethyl-3-vinylphenylsilane,
(diethylamino)diethyl-4-vinylphenylsilane,
(diethylamino)diethyl-3-vinylphenylsilane,
(di-n-propylamino)diethyl-4-vinylphenylsilane,
(di-n-propylamino)diethyl-3-vinylphenylsilane,
(di-n-butylamino)diethyl-4-vinylsilane,
(di-n-butylamino)diethyl-3-vinylphenylsilane.

Examples of the compound represented by the formula (1) in which $R^{11}$ is a hydrogen atom and two of $X^1$, $X^2$ and $X^3$ are dialkylamino groups include the following compounds.
Compounds in which m is 0:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane,
bis(di-n-butylamino)ethylvinylsilane.
Compounds in which m is 1:
bis(dimethylamino)methyl-4-vinylphenylsilane,
bis(dimethylamino)methyl-3-vinylphenylsilane,
bis(diethylamino)methyl-4-vinylphenylsilane,
bis(diethylamino)methyl-3-vinylphenylsilane,
bis(di-n-propylamino)methyl-4-vinylphenylsilane,
bis(di-n-propylamino)methyl-3-vinylphenylsilane,
bis(di-n-butylamino)methyl-4-vinylphenylsilane,
bis(di-n-butylamino)methyl-3-vinylphenylsilane,
bis(dimethylamino)ethyl-4-vinylphenylsilane,
bis(dimethylamino)ethyl-3-vinylphenylsilane,
bis(diethylamino)ethyl-4-vinylphenylsilane,
bis(diethylamino)ethyl-3-vinylphenylsilane,
bis(di-n-propylamino)ethyl-4-vinylphenylsilane,
bis(di-n-propylamino)ethyl-3-vinylphenylsilane,
bis(di-n-butylamino)ethyl-4-vinylphenylsilane,
bis(di-n-butylamino)ethyl-3-vinylphenylsilane.

Examples of the compound represented by the formula (1) in which $R^{11}$ is a methyl group and two of $X^1$, $X^2$ and $X^3$ are dialkylamino groups include the following compounds.
Compounds in which m is 1:
bis(dimethylamino)methyl-4-isopropenylphenylsilane,
bis(dimethylamino)methyl-3-isopropenylphenylsilane,
bis(diethylamino)methyl-4-isopropenylphenylsilane,
bis(diethylamino)methyl-3-isopropenylphenylsilane,
bis(di-n-propylamino)methyl-4-isopropenylphenylsilane,
bis(di-n-propylamino)methyl-3-isopropenylphenylsilane,
bis(di-n-butylamino)methyl-4-isopropenylphenylsilane,
bis(di-n-butylamino)methyl-3-isopropenylphenylsilane,
bis(dimethylamino)ethyl-4-isopropenylphenylsilane,
bis(dimethylamino)ethyl-3-isopropenylphenylsilane,
bis(diethylamino)ethyl-4-isopropenylphenylsilane,
bis(diethylamino)ethyl-3-isopropenylphenylsilane,
bis(di-n-propylamino)ethyl-4-isopropenylphenylsilane,
bis(di-n-propylamino)ethyl-3-isopropenylphenylsilane,
bis(di-n-butylamino)ethyl-4-isopropenylphenysilane,
bis(di-n-butylamino)ethyl-3-isopropenylphenylsilane.

Examples of the compound represented by the formula (1) in which $R^{11}$ is a vinyl group and two of $X^1$, $X^2$ and $X^3$ are dialkylamino groups include the following compounds.
Compounds in which m is 0:
bis(dimethylamino)methyl(1-methylene-2-propenyl)silane,
bis(diethylamino)methyl(1-methylene-2-propenyl)silane,
bis(di-n-propylamino)methyl(1-methylene-2-propenyl)silane,
bis(di-n-butylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(di-n-propylamino)ethyl(1-methylene-2-propenyl)silane,
bis(di-n-butylamino)ethyl(1-methylene-2-propenyl)silane.

Examples of the compound represented by the formula (1) in which $R^{11}$ is a hydrogen atom and three of $X^1$, $X^2$ and $X^3$ are dialkylamino groups include the following compounds.
Compound in which m is 0:
tris(dimethylamino)vinylsilane,
tris(diethylamino)vinylsilane,
tris(di-n-propylamino)vinylsilane,
tris(di-n-butylamino)vinylsilane.
Compounds in which m is 1:
tris(dimethylamino)-4-vinylphenylsilane,
tris(dimethylamino)-3-vinylphenylsilane,
tris(diethylamino)-4-vinylphenylsilane,
tris(diethylamino)-3-vinylphenylsilane,
tris(di-n-propylamino)-4-vinylphenylsilane,
tris(di-n-propylamino)-3-vinylphenylsilane,
tris(di-n-butylamino)-4-vinylphenylsilane,
tris(di-n-butylamino)-3-vinylphenylsilane.

Examples of the compound represented by the formula (1) in which $R^{11}$ is a methyl group and three of $X^1$, $X^2$ and $X^3$ are dialkylamino groups include the following compounds.
Compounds in which m is 1:
tris(dimethylamino)-4-isopropenylphenylsilane,
tris(dimethylamino)-3-isopropenylphenylsilane,
tris(diethylamino)-4-isopropenylphenylsilane,
tris(diethylamino)-3-isopropenylphenylsilane,
tris(di-n-propylamino)-4-isopropenylphenylsilane,
tris(di-n-propylamino)-3-isopropenylphenylsilane,
tris(di-n-butylamino)-4-isopropenylphenylsilane,
tris(di-n-butylamino)-3-isopropenylphenylsilane.

Examples of the compound represented by the formula (1) in which $R^{11}$ is a vinyl compound and three of $X^1$, $X^2$ and $X^3$ are dialkylamino groups include the following compounds.
Compounds in which m is 0:
tris(dimethylamino)(1-methylene-2-propenyl)silane,
tris(diethylamino)(1-methylene-2-propenyl)silane,
tris(di-n-propylamino)(1-methylene-2-propenyl)silane,
tris(di-n-butylamino)(1-methylene-2-propenyl)silane.

The compound represented by the formula (1) is preferably a compound in which two of $X^1$, $X^2$ and $X^3$ are dialkylamino groups, more preferably a compound in which $R^{11}$ is a hydrogen atom and m=0. Further preferable is a compound in which the remaining one of $X^1$, $X^2$ and $X^3$ is an alkyl group or an alkoxyalkyl group. Particularly preferable are:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane,
bis(di-n-butylamino)ethylvinylsilane.

$R^{21}$ in the formula (2) represents a hydrogen atom or a hydrocarbyl group.

Examples of the hydrocarbyl group of $R^{21}$ include an alkyl group and an alkenyl group. Examples of the alkyl group include a methyl group, an ethyl group, a n-propyl group, an isopropyl group, a n-butyl group, a sec-butyl group, and a tert-butyl group, preferably a methyl group. Examples of the alkenyl group include a vinyl group, an allyl group, a 1-propenyl group, and a 1-methylethenyl group, preferably a vinyl group.

$R^{21}$ is preferably a hydrogen atom, a methyl group, or a vinyl group.

Examples of the hydrocarbylene group of $R^{22}$ include an alkylene group, an arylene group, and a group in which an arylene group and an alkylene group are bonded.

Examples of the alkylene group include a methylene group, an ethylene group, and a trimethylene group. Preferable is a methylene group or an ethylene group.

Examples of the arylene group include a phenylene group, a naphthylene group, and a biphenylene group. Preferable is a phenylene group.

Examples of the group in which an arylene group and an alkylene group are bonded include a group in which a phenylene group and an alkylene group are bonded, a group in which a naphthylene group and an alkylene group are bonded, and a group in which a biphenylene group and an alkylene group are bonded. Preferable is a group in which a phenylene group and an alkylene group are bonded.

In addition, the group in which an arylene group and an alkylene group are bonded is preferably such that a carbon atom of an arylene group is bonded to a carbon atom to which $R^{21}$ in the formula (2) is bonded.

Examples of the group in which a phenylene group and an alkylene group are bonded (phenylene-alkylene group) include a para-phenylene-alkylene group (e.g., a group represented by the following formula (2a)), a meta-phenylene-alkylene-group (e.g., a group represented by the following formula (2b)), and an ortho-phenylene-alkylene group (e.g., a group represented by the following formula (2c)) depending on a position of a carbon atom on a benzene ring from which a hydrogen atom has been removed, and a position of a phenylene group to which an alkylene group is bonded.

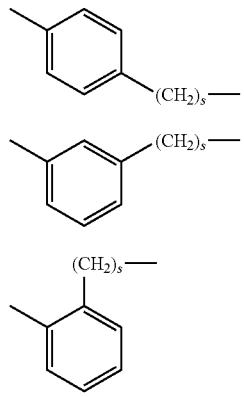

wherein s represents an integer of 1 to 10.

The group in which an arylene group and an alkylene group are bonded is preferably a group in which a phenylene group and an alkylene group are bonded, more preferably a group represented by the above formula (2a), or a group represented by the above formula (2b), further preferably a para-phenylene-methylene group (a group represented by the formula (2a) in which s=1), a meta-phenylene-methylene group (a group represented by the formula (2b) in which s=1), a para-phenylene-ethylene group (a group represented by the formula (2a) in which s=2), or a meta-phenylene-ethylene group (a group represented by the formula (2b) in which s=2).

When $R^{21}$ is a hydrogen atom or a methyl group and n is 1, $R^{22}$ is preferably a group in which an arylene group and an alkylene group are bonded, or an arylene group, more preferably a group in which a phenylene group and an alkylene group are bonded, or a phenylene group, further preferably a group represented by the following formula (2-Y), particularly preferably a group represented by the following formula (2-Ya) or a group represented by the following formula (2-Yb). In addition, in the formula, r is an integer of 0 to 5, preferably 0 to 2.

wherein r represents an integer of 0 to 5 and, when r is a integer of 1 to 5, $(CH_2)_r$ is a substituent on a benzene ring, and $(CH_2)_r$ bonds to A and, when r is 0, $(CH_2)_r$ represents a bond between a benzene ring and A.

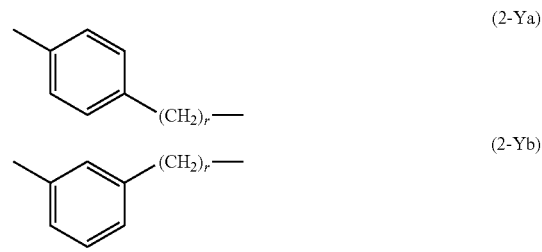

wherein r represents an integer of 0 to 5 and, when r is an integer of 1 to 5, $(CH_2)_r$ bonds to A and, when r is 0, $(CH_2)_r$ represents a bond between a benzene ring and A.

When $R^{21}$ is a vinyl group and n is 1, $R^{22}$ is preferably an alkylene group, more preferably a methylene group or an ethylene group.

A is a substituted amino group, or a nitrogen-containing heterocyclic group.

The substituted amino group of A is preferably a group represented by the following formula (2-X).

wherein $R^{23}$ and $R^{24}$ each represent a hydrocarbyl group, or a trihydrocarbylsilyl group, or $R^{23}$ and $R^{24}$ are bonded to represent a hydrocarbylene group optionally having a nitrogen atom and/or an oxygen atom as a hetero group, or $R^{23}$ and $R^{24}$ are one group, and represent a group which bonds to a nitrogen atom with a double bond.

Examples of the hydrocarbyl group of $R^{23}$ and $R^{24}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group and a propargyl group. Examples of the aryl group include a phenyl group, a tolyl group, and a xylyl group. Examples of the aralkyl group include a benzyl group.

The hydrocarbyl group of $R^{23}$ and $R^{24}$ has preferably 1 to 10, more preferably 1 to 4, further preferably 1 to 2 carbon atoms.

The hydrocarbyl group of $R^{23}$ and $R^{24}$ is preferably an alkyl group, or an alkenyl group, more preferably an alkyl group, further preferably a linear alkyl group.

Examples of the trihydrocarbylsilyl group of $R^{23}$ and $R^{24}$ include trialkylsilyl groups such as a trimethylsilyl group, a triethylsilyl group, a triisopropylsilyl group, and a tert-butyldimethylsilyl group.

The trihydrocarbylsilyl group of $R^{23}$ and $R^{24}$ is preferably a trialkylsilyl group having 3 to 9 carbon atoms, more preferably a trialkylsilyl group in which an alkyl group bonded to a silicon atom is an alkyl group having 1 to 4 carbon atoms, further preferably a trimethylsilyl group.

Examples of the hydrocarbylene group optionally having a nitrogen atom and/or an oxygen atom as a hetero atom in which $R^{23}$ and $R^{24}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{23}$ and $R^{24}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{23}$ and $R^{24}$ are bonded is preferably a hydrocarbylene group, more preferably an alkylene group, further preferably a polymethylene group.

Examples of one group in which $R^{23}$ and $R^{24}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{23}$ and $R^{24}$ bond to a nitrogen atom with a double bond has preferably 2 to 20, more preferably 2 to 6 carbon atoms.

$R^{23}$ and $R^{24}$ are preferably a hydrocarbyl group, a trihydrocarbylsilyl group, or a hydrocarbylene group in which $R^{23}$ and $R^{24}$ are bonded.

Examples of the group represented by the formula (2-X) include a non-cyclic amino group and a cyclic amino group.

Examples of the non-cyclic amino group include a dialkylamino group and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl)amino group include a bis(trimethylsilyl)amino group and a bis(tert-butyldimethylsilyl)amino group.

Examples of the non-cyclic amino group include an ethylideneamino group, a 1-methylpropylideneamino group, a 1,3-dimethylbutylideneamino group, a 1-methylethylideneamino group and a 4-N,N-dimethylaminobenzylideneamino group.

Examples of the cyclic amino group include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (2-X) is preferably a group in which $R^{23}$ and $R^{24}$ are hydrocarbyl groups, a group in which $R^{23}$ and $R^{24}$ are trihydrocarbylsilyl groups, a group in which $R^{23}$ and $R^{24}$ are bonded to form a hydrocarbylene group. More preferable is a group in which $R^{23}$ and $R^{24}$ are linear alkyl groups, a group in which $R^{23}$ and $R^{24}$ are trialkylsilyl groups, or a group in which $R^{23}$ and $R^{24}$ are bonded to form a polymethylene group.

The group represented by the formula (2-X) is further preferably a dimethylamino group, a diethylamino group, a di(n-propyl)amino group, a di(n-butyl)amino group, a bis(trimethylsilyl)amino group, a bis(tert-butyldimethylsilyl)amino group, a 1-pyrrolidinyl group, a 1-piperidinyl group, or a 1-hexamethyleneimino group.

Examples of the nitrogen-containing heterocyclic group of A include a nitrogen-containing alicyclic hetorocyclic group and a nitrogen-containing aromatic heterocyclic group.

Examples of the nitrogen-containing alicyclic heterocyclic group of A include a group having only a nitrogen atom as a hetero atom constituting a ring, a group having a nitrogen atom and an oxygen atom as a hetero atom constituting a ring, and a group having a nitrogen atom and a sulfur atom as a hetero atom constituting a ring.

Examples of the nitrogen-containing alicyclic heterocyclic group having only a nitrogen atom as a hetero atom constituting a ring include a group having an aziridine ring, a group having an azetidine ring, a group having a pyrrolidine ring, a group having a piperidine ring, a group having a hexamethyleneimine ring, a group having an imidazolidine ring, a group having a piperazine ring, and a group having a pyrazolidine ring.

Examples of the group having an aziridine ring include an 1-alkyl-2-aziridinyl group.

Examples of the group having an azetidine ring include an 1-alkyl-2-azetidinyl group and an 1-alkyl-3-azetidinyl group.

Examples of the group having a pyrrolidine ring include an 1-alkyl-2-pyrrolidinyl group and an 1-alkyl-3-pyrrolidinyl group.

Examples of the group having a piperidine ring include an 1-alkyl-2-piperidinyl group, an 1-alkyl-3-piperidinyl group, and an 1-alkyl-4-piperidinyl group.

Examples of the group having a hexamethyleneimine ring include an 1-alkyl-2-hexamethyleneimino group, an 1-alkyl-3-hexamethyleneimino group, and an 1-alkyl-4-hexamethyleneimino group.

Examples of the group having an imidazolidine ring include a 1,3-dialkyl-2-imidazolidyl group and a 1,3-dialkyl-4-imidazolidyl group.

Examples of the group having a piperazine ring include a 1,4-dialkyl-2-piperazinyl group.

Examples of the group having a pyrazolidine ring include a 1,2-dialkyl-3-pyrazolidyl group and a 1,2-dialkyl-4-pyrazolidyl group.

Examples of the nitrogen-containing alicyclic heterocyclic group having a nitrogen atom and an oxygen atom as a hetero atom constituting a ring include a group having a morpholine ring and a group having an isooxazolidine ring.

Examples of the group having a morpholine ring include an 1-alkyl-2-morpholino group and an 1-alkyl-3-morpholino group.

Examples of the group having an isooxazolidine ring include an 1-alkyl-3-isooxazolidinyl group, an 1-alkyl-4-isooxazolidinyl group, and an 1-alkyl-5-isooxazolidinyl group.

Examples of the nitrogen-containing alicyclic heterocyclic group having a nitrogen atom and a sulfur atom as a hetero atom constituting a ring include a group having a thiomorpholine ring and a group having an isothiazolidine ring.

Examples of the group having a thiomorpholine ring include an 1-alkyl-2-thiomorpholino group and an 1-alkyl-3-thiomorpholino group.

Examples of the group having an isothiazolidine ring include an 1-alkyl-3-isothiazolidinyl group, an 1-alkyl-4-isothiazolidinyl group, and an 1-alkyl-5-isothiazolidinyl group.

Examples of the nitrogen-containing aromatic heterocyclic group of A include a group having only a nitrogen atom as a hetero atom constituting a ring, a group having a nitrogen atom and an oxygen atom as a hetero atom constituting a ring, and a group having a nitrogen atom and a sulfur atom as a hetero atom constituting a ring.

Examples of the nitrogen-aromatic heterocyclic group having only a nitrogen atom as a hetero atom constituting a ring include a group having a pyrrole ring, a group having an imidazole ring, a group having a pyrazole ring, a group having a pyridine ring, a group having a pyridazine ring, a group having a pyrimidine ring, a group having a pyrazine ring, a group having a quinoline ring, a group having an isoquinoline ring, a group having a cinnoline ring, a group having a quinazoline ring, and a group having a phthalazine ring.

Examples of the group having a pyrrole ring include a 2-pyrrolyl group, a 3-pyrrolyl group, a 2-(1-methylpyrrolyl) group, and a 3-(1-methylpyrrolyl) group.

Examples of the group having an imidazole ring include a 2-imidazolyl group, a 4-imidazolyl group, a 5-imidazolyl group, a 2-(1-methylimidazolyl) group, a 4-(1-methylimidazolyl) group, and a 5-(1-methylimidazolyl) group.

Examples of the group having a pyrazole ring include a 3-pyrazolyl group, a 4-pyrazolyl group, a 5-pyrazolyl group, a 3-(1-methylpyrazolyl) group, a 4-(1-methylpyrazolyl) group and a 5-(1-methylpyrazolyl) group.

Examples of the group having a pyridine ring include a 2-pyridyl group, a 3-pyridyl group, and a 4-pyridyl group.

Examples of the group having a pyridazine ring include a 3-pyridazyl group and a 4-pyridazyl group.

Examples of the group having a pyrimidine ring include a 2-pyrimidyl group, a 4-pyrimidyl group, and a 5-pyrimidyl group.

Examples of the group having a pyrazine group include a 2-pyrazyl group.

Examples of the group having a quinoline ring include a 2-quinolyl group, a 3-quinolyl group, a 4-quinolyl group, a 5-quinolyl group, a 6-quinolyl group, a 7-quinolyl group, and an 8-quinolyl group.

Examples of the group having an isoquinoline ring include a 1-isoquinolyl group, a 3-isoquinolyl group, a 4-isoquinolyl group, a 5-isoquinolyl group, a 6-isoquinolyl group, a 7-isoquinolyl group, and an 8-isoquinolyl group.

Examples of the group having a cinnoline ring include a 3-cinnolinyl group, a 4-cinnolinyl group, a 5-cinnolinyl group, a 6-cinnolinyl group, a 7-cinnolinyl group, and an 8-cinnolinyl group.

Examples of the group having a quinazoline ring include a 2-quinazolinyl group, a 4-quinazolinyl group, a 5-quinazolinyl group, a 6-quinazolinyl group, a 7-quinazolinyl group, and an 8-quinazolinyl group.

Examples of the group having a phthalazine ring include a 1-phthalazinyl group, a 5-phthalazinyl group and a 6-phthalazinyl group.

The nitrogen-containing aromatic heterocyclic group having only a nitrogen atom as a hetero atom constituting a ring is preferably the group having an imidazole ring, the group having a pyridine ring, or the group having a quinoline ring.

Examples of the nitrogen-containing aromatic heterocyclic group having a nitrogen atom and an oxygen atom as a hetero atom constituting a ring include a group having an oxazole ring and a group having an isooxazole ring.

Examples of the group having an oxazole ring include a 2-oxazolyl group, a 4-oxazolyl group, and a 5-oxazolyl group.

Examples of the group having an isooxazole ring include a 3-isooxazolyl group, a 4-isooxazolyl group, and a 5-isooxazolyl group.

The nitrogen-containing aromatic heterocyclic group having a nitrogen atom and an oxygen atom as a hetero atom constituting a ring is preferably the group having an oxazole ring.

Examples of the nitrogen-containing aromatic heterocyclic group having a nitrogen atom and a sulfur atom as a hetero atom constituting a ring include a group having a thiazole ring and a group having an isothiazole ring.

Examples of the group having a thiazole ring include a 2-thiazolyl group, a 4-thiazolyl group, and a 5-thiazolyl group.

Examples of the group having an isothiazole ring include a 3-isothiazolyl group, a 4-isothiazolyl group, and a 5-isothiazolyl group.

The nitrogen-containing aromatic heterocyclic group having a nitrogen atom and a sulfur atom as a hetero atom constituting a ring is preferably the group having a thiazole ring.

The nitrogen-containing heterocyclic group of A is preferably the nitrogen-containing aromatic heterocyclic group, more preferably the nitrogen-containing aromatic heterocyclic group having only a nitrogen atom as a hetero atom constituting a ring, further preferably the group having an imidazole ring, the group having a pyridine ring, or the group having a quinoline group, particularly preferably the group having a pyridine ring.

Examples of the compound represented by the formula (2) in which $R^{21}$ is a hydrogen atom, n is 0, and A is a substituted amino group include the following compounds.
1-vinylpyrrolidine,
1-vinylpiperidine,
1-vinylhexamethyleneimine,
1-vinylpiperazine,
1-vinylpyrrole,
1-vinylimidazole,
1-vinylpyrazole,
vinylquinoline.

Examples of the compound represented by the formula (2) in which $R^{21}$ is a hydrogen atom, n is 1, $R^{22}$ is a group represented by the formula (2-Y), and A is a substituted amino group include the following compounds.
Compounds in which r in the formula (2-Y) is 0:
4-N,N-dimethylaminostyrene,
3-N,N-dimethylaminostyrene,
4-N,N-diethylaminostyrene,
3-N,N-diethylaminostyrene,
4-N,N-di-n-propylaminostyrene,
3-N,N-di-n-propylaminostyrene,
4-N,N-di-n-butylaminostyrene,
3-N,N-di-n-butylaminostyrene,
4-N,N-diallylaminostyrene,
3-N,N-diallylaminostyrene,
4-N,N-bis(trimethylsilyl)aminostyrene,
3-N,N-bis(trimethylsilyl)aminostyrene,
4-N,N-bis(tert-butyldimethylsilyl)aminostyrene,
3-N,N-bis(tert-butyldimethylsilyl)aminostyrene, 4-(1-aziridinyl)styrene,
3-(1-aziridinyl)styrene,
4-(1-pyrrolidinyl)styrene,
3-(1-pyrrolidinyl)styrene,
4-(1-piperidinyl)styrene,
3-(1-piperidinyl)styrene,
4-(1-hexamethyleneimino)styrene,
3-(1-hexamethyleneimino)styrene.
Compounds in which r in the formula (2-Y) is 1:
4-N,N-dimethylaminomethylstyrene,
3-N,N-dimethylaminomethylstyrene,
4-N,N-diethylaminomethylstyrene,
3-N,N-diethylaminomethylstyrene,
4-N,N-di-n-propylaminomethylstyrene,
3-N,N-di-n-propylaminomethylstyrene,
4-N,N-di-n-butylaminomethylstyrene,
3-N,N-di-n-butylaminomethylstyrene,
4-N,N-diallylaminomethylstyrene,
3-N,N-diallylaminomethylstyrene,
4-N,N-bis(trimethylsilyl)aminomethylstyrene,
3-N,N-bis(trimethylsilyl)aminomethylstyrene,
4-N,N-bis(tert-butyldimethylsilyl)aminomethylstyrene,
3-N,N-bis(tert-butyldimethylsilyl)aminomethylstyrene,
4-(1-aziridinyl)methylstyrene,
3-(1-aziridinyl)methylstyrene,
4-(1-pyrrolidinyl)methylstyrene,
3-(1-pyrrolidinyl)methylstyrene,
4-(1-piperidinyl)methylstyrene,
3-(1-piperidinyl)methylstyrene,
4-(1-hexamethyleneimino)methylstyrene,
3-(1-hexamethyleneimino)methylstyrene.
Compounds in which r in the formula (2-Y) is 2:
4-N,N-dimethylaminoethylstyrene,
3-N,N-dimethylaminoethylstyrene,
4-N,N-diethylaminoethylstyrene,
3-N,N-diethylaminoethylstyrene,
4-N,N-di-n-propylaminoethylstyrene,
3-N,N-di-n-propylaminoethylstyrene,
4-N,N-di-n-butylaminoethylstyrene,
3-N,N-di-n-buytlaminoethylstyrene,
4-N,N-diallylaminoethylstyrene,
3-N,N-diallylaminoethylstyrene,
4-N,N-bis(trimethylsilyl)aminoethylstyrene,
3-N,N-bis(trimethylsilyl)aminoethylstyrene,
4-N,N-bis(tert-butyldimethylsilyl)aminoethylstyrene,
3-N,N-bis(tert-butyldimethylsilyl)aminoethylstyrene,
4-(1-aziridinyl)ethylstyrene,
3-(1-aziridinyl)ethylstyrene,
4-(1-pyrrolidinyl)ethylstyrene,
3-(1-pyrrolidinyl)ethylstyrene,
4-(1-piperidinyl)ethylstyrene,
3-(1-piperidinyl)ethylstyrene,
4-(1-hexamethyleneimino)ethylstyrene,
3-(1-hexamethyleneimino)ethylstyrene.

Examples of the compound represented by the formula (2) in which $R^{21}$ is a methyl group, n is 0, and A is a substituted amino group include the following compounds.
1-isopropenylpyrrolidine,
1-isopropenylpiperidine,
1-isopropenylhexamethyleneimine,
1-isopropenylpiperazine,
1-isopropenylpyrrole,
1-isopropenylimidazole,
1-isopropenylpyrazole,
isopropenylquinoline.

Examples of the compound represented by the formula (2) in which $R^{21}$ is a methyl group, n is 1, $R^{22}$ is a group represented by the formula (2-Y), and A is a substituted amino group include the following compounds.
Compounds in which r in the formula (2-Y) is 0:
4-N,N-dimethylaminoisopropenylbenzene,
3-N,N-dimethylaminoisopropenylbenzene,
4-N,N-diethylaminoisopropenylbenzene,
3-N,N-diethylaminoisopropenylbenzene,
4-N,N-di-n-propylaminoisopropenylbenzene,
3-N,N-di-n-propylaminoisopropenylbenzene,
4-N,N-di-n-butylaminoisopropenylbenzene,
3-N,N-di-n-butylaminoisopropenylbenzene,
4-N,N-diallylaminoisopropenylbenzene,
3-N,N-diallylaminoisopropenylbenzene,
4-N,N-bis(trimethylsilyl)aminoisopropenylbenzene,
3-N,N-bis(trimethylsilyl)aminoisopropenylbenzene,
4-N,N-bis(tert-butyldimethylsilyl)aminoisopropenylbenzene,
3-N,N-bis(tert-butyldimethylsilyl)aminoisopropenylbenzene,
4-(1-aziridinyl)isopropenylbenzene,
3-(1-aziridinyl)isopropenylbenzene,
4-(1-pyrrolidinyl)isopropenylbenzene,
3-(1-pyrrolidinyl)isopropenylbenzene,
4-(1-piperidinyl)isopropenylbenzene,
3-(1-piperidinyl)isopropenylbenzene,
4-(1-hexamethyleneimino)isopropenylbenzene,
3-(1-hexamethyleneimino)isopropenylbenzene.
Compounds in which r in the formula (2-Y) is 1:
4-N,N-dimethylaminomethylisopropenylbenzene,
3-N,N-dimethylaminomethylisopropenylbenzene,
4-N,N-diethylaminomethylisopropenylbenzene,
3-N,N-diethylaminomethylisopropenylbenzene,
4-N,N-di-n-propylaminomethylisopropenylbenzene,
3-N,N-di-n-propylaminomethylisopropenylbenzene,
4-N,N-di-n-butylaminomethylisopropenylbenzene,
3-N,N-di-n-butylaminomethylisopropenylbenzene,
4-N,N-diallylaminomethylisopropenylbenzene,
3-N,N-diallylaminomethylisopropenylbenzene,
4-N,N-bis(trimethylsilyl)aminomethylisopropenylbenzene,
3-N,N-bis(trimethylsilyl)aminomethylisopropenylbenzene,
4-N,N-bis(tert-butyldimethylsilyl)aminomethylisopropenylbenzene,
3-N,N-bis(tert-butyldimethylsilyl)aminomethylisopropenylbenzene,
4-(1-aziridinyl)methylisopropenylbenzene,
3-(1-aziridinyl)methylisopropenylbenzene,
4-(1-pyrrolidinyl)methylisopropenylbenzene,
3-(1-pyrrolidinyl)methylisopropenylbenzene,
4-(1-piperidinyl)methylisopropenylbenzene,
3-(1-piperidinyl)methylisopropenylbenzene,
4-(1-hexamethyleneimino)methylisopropenylbenzene,
3-(1-hexamethyleneimino)methylisopropenylbenzene.
Compounds in which r in the formula (2-Y) is 2:
4-N,N-dimethylaminoethylisopropenylbenzene,
3-N,N-dimethylaminoethylisopropenylbenzene,
4-N,N-diethylaminoethylisopropenylbenzene,
3-N,N-diethylaminoethylisopropenylbenzene,
4-N,N-di-n-propylaminoethylisopropenylbenzene,
3-N,N-di-n-propylaminoethylisopropenylbenzene,
4-N,N-di-n-butylaminoethylisopropenylbenzene,
3-N,N-di-n-butylaminoethylisopropenylbenzene,
4-N,N-diallylaminoethylisopropenylbenzene,
3-N,N-diallylaminoethylisopropenylbenzene,
4-N,N-bis(trimethylsilyl)aminoethylisopropenylbenzene,
3-N,N-bis(trimethylsilyl)aminoethylisopropenylbenzene,
4-N,N-bis(tert-butyldimethylsilyl)aminoethylisopropenylbenzene, 3-N,N-bis(tert-butyldimethylsilyl)aminoethylisopropenylbenzene,
4-(1-aziridinyl)ethylisopropenylbenzene,
3-(1-aziridinyl)ethylisopropenylbenzene,
4-(1-pyrrolidinyl)ethylisopropenylbenzene,
3-(1-pyrrolidinyl)ethylisopropenylbenzene,
4-(1-piperidinyl)ethylisopropenylbenzene,
3-(1-piperidinyl)ethylisopropenylbenzene,
4-(1-hexamethyleneimino)ethylisopropenylbenzene,
3-(1-hexamethyleneimino)ethylisopropenylbenzene.

Examples of the compound represented by the formula (2) in which $R^{21}$ is a vinyl group, n is 0, and A is a substituted amino group include the following compounds.
2-N,N-dimethylamino-1,3-butadiene,
2-N,N-diethylamino-1,3-butadiene,
2-N,N-di-n-propylamino-1,3-butadiene,
2-N,N-di-n-butylamino-1,3-butadiene,
2-N,N-diallylamino-1,3-butadiene,
2-N,N-bis(trimethylsilyl)amino-1,3-butadiene,
2-N,N-bis(tert-butyldimethylsilyl)amino-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene,
2-(1-imidazolyl)-1,3-butadiene,
2-(1-pyrazolyl)-1,3-butadiene.

Examples of the compound represented by the formula (2) in which $R^{21}$ is a vinyl group, n is 1, $R^{22}$ is an alkylene group, and A is a substituted amino group include the following compounds.
Compounds in which $R^{22}$ is a methylene group:
2-N,N-dimethylaminomethyl-1,3-butadiene,
2-N,N-diethylaminomethyl-1,3-butadiene,
2-N,N-di-n-propylaminomethyl-1,3-butadiene,
2-N,N-di-n-butylaminomethyl-1,3-butadiene,
2-N,N-diallylaminomethyl-1,3-butadiene,
2-N,N-bis(trimethylsilyl)aminomethyl-1,3-butadiene,
2-N,N-bis(tert-butyldimethylsilyl)aminomethyl-1,3-butadiene,
2-(1-aziridinyl)methyl-1,3-butadiene,
2-(1-pyrrolidinyl)methyl-1,3-butadiene,
2-(1-piperidinyl)methyl-1,3-butadiene,
2-(1-hexamethyleneimino)methyl-1,3-butadiene,
1-(2-methylene-3-butenyl)pyrrole,
1-(2-methylene-3-butenyl)imidazole,
1-(2-methylene-3-butenyl)pyrazole.
Compounds in which $R^{22}$ is an ethylene group:
5-N,N-dimethylamino-3-methylene-1-pentene,
5-N,N-diethylamino-3-methylene-1-pentene,
5-N,N-di-n-propylamino-3-methylene-1-pentene,
5-N,N-di-n-butylamino-3-methylene-1-pentene,
5-N,N-diallylamino-3-methylene-1-pentene,
5-N,N-bis(trimethylsilyl)amino-3-methylene-1-pentene,
5-N,N-bis(tert-butyldimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole,
1-(3-methylene-4-pentenyl)imidazole,
1-(3-methylene-4-pentenyl)pyrazole.

Examples of the compound represented by the formula (2) in which $R^{21}$ is a hydrogen atom, n is 1, $R^{22}$ is a group represented by the formula (2-Y), and A is a nitrogen-containing alicyclic heterocyclic group include the following compounds.
Compounds in which r in the formula (2-Y) is 0:
4-(1-methyl-2-aziridinyl)styrene,
4-1-methyl-2-pyrrolidinylstyrene,
4-1-methyl-3-pyrrolidinylstyrene,
4-1-methyl-2-hexamethyleneiminostyrene,
4-1-methyl-3-hexamethyleneiminostyrene,
4-1-methyl-4-hexamethyleneiminostyrene.
Compounds in which r in the formula (2-Y) is 1:
4-1-methyl-2-aziridinylmethylstyrene,
4-1-methyl-2-pyrrolidinylmethylstyrene,
4-1-methyl-3-pyrrolidinylmethylstyrene,
4-1-methyl-2-hexamethyleneiminomethylstyrene,
4-1-methyl-3-hexamethyleneiminomethylstyrene,
4-1-methyl-4-hexamethyleneiminomethylstyrene.
Compounds in which r in the formula (2-Y) is 2:
4-1-methyl-2-aziridinylethylstyrene,
4-1-methyl-2-pyrrolidinylethylstyrene,
4-1-methyl-3-pyrrolidinylethylstyrene,
4-1-methyl-2-hexamethyleneiminoethylstyrene,
4-1-methyl-3-hexamethyleneiminoethylstyrene,
4-1-methyl-4-hexamethyleneiminoethylstyrene.

Examples of the compound represented by the formula (2) in which $R^{21}$ is a methyl group, n is 1, $R^{22}$ is a group represented by the formula (2-Y), and A is a nitrogen-containing alicyclic heterocyclic group include the following compounds.
Compounds in which r in the formula (2-Y) is 0:
4-1-methyl-2-aziridinylisopropenylbenzene,
4-1-methyl-2-pyrrolidinylisopropenylbenzene,
4-1-methyl-3-pyrrolidinylisopropenylbenzene,
4-1-methyl-2-hexamethyleneiminoisopropenylbenzene,
4-1-methyl-3-hexamethyleneiminoisopropenylbenzene,
4-1-methyl-4-hexamethyleneiminoisopropenylbenzene.
Compounds in which r in the formula (2-Y) is 1:
4-1-methyl-2-aziridinylmethylisopropenylbenzene,
4-1-methyl-2-pyrrolidinylmethylisopropenylbenzene,
4-1-methyl-3-pyrrolidinylmethylisopropenylbenzene,
4-1-methyl-2-hexamethyleneiminomethylisopropenylbenzene,
4-1-methyl-3-hexamethyleneiminomethylisopropenylbenzene,
4-1-methyl-4-hexamethyleneiminomethylisopropenylbenzene.
Compounds in which r in the formula (2-Y) is 2:
4-1-methyl-2-aziridinylethylisopropenylbenzene,
4-1-methyl-2-pyrrolidinylethylisopropenylbenzene,
4-1-methyl-3-pyrrolidinylethylisopropenylbenzene,
4-1-methyl-2-hexamethyleneiminoethylisopropenylbenzene,
4-1-methyl-3-hexamethyleneiminoethylisopropenylbenzene,
4-1-methyl-4-hexamethyleneiminoethylisopropenylbenzene.

Examples of the compound represented by the formula (2) in which $R^{21}$ is a vinyl group, n is 0, and A is a nitrogen-containing alicyclic heterocyclic group include the following compounds.
1-methyl-2-(1-methylene-2-propenyl)aziridine,
1-methyl-2-(1-methylene-2-propenyl)pyrrolidine,
1-methyl-3-(1-methylene-2-propenyl)pyrrolidine,
1-methyl-2-(1-methylene-2-propenyl)hexamethyleneimine,
1-methyl-3-(1-methylene-2-propenyl)hexamethyleneimine,
1-methyl-4-(1-methylene-2-propenyl)hexamethyleneimine.

Examples of the compound represented by the formula (2) in which $R^{21}$ is a vinyl group, n is 1, $R^{22}$ is an alkylene group, and A is a nitrogen-containing alicyclic heterocyclic group include the following compounds.
Compounds in which $R^{22}$ is a methylene group:
1-methyl-2-(2-methylene-3-butenyl)aziridine,
1-methyl-2-(2-methylene-3-butenyl)pyrrolidine,
1-methyl-3-(2-methylene-3-butenyl)pyrrolidine,
1-methyl-2-(2-methylene-3-butenyl)hexamethyleneimine,
1-methyl-3-(2-methylene-3-butenyl)hexamethyleneimine,
1-methyl-4-(2-methylene-3-butenyl)hexamethyleneimine.
Compounds in which $R^{22}$ is an ethylene group:
1-methyl-2-(3-methylene-4-pentenyl)aziridine,
1-methyl-2-(3-methylene-4-pentenyl)pyrrolidine,
1-methyl-3-(3-methylene-4-pentenyl)pyrrolidine,
1-methyl-2-(3-methylene-4-pentenyl)hexamethyleneimine,
1-methyl-3-(3-methylene-4-pentenyl)hexamethyleneimine,
1-methyl-4-(3-methylene-4-pentenyl)hexamethyleneimine.

Examples of the compound represented by the formula (2) in which $R^{21}$ is a hydrogen atom, n is 0, and A is a nitrogen-containing aromatic heterocyclic group include the following compounds.
1-methyl-2-vinylimidazole,
1-methyl-4-vinylimidazole,
1-methyl-5-vinylimidazole,
2-vinylpyridine,
3-vinylpyridine,
4-vinylpyridine,
2-vinylquinoline,
3-vinylquinoline,
4-vinylquinoline.

Examples of the compound represented by the formula (2) in which $R^{21}$ is a methyl group, n is 0, and A is a nitrogen-containing aromatic heterocyclic group include the following compounds.
1-methyl-2-isopropenylimidazole,
1-methyl-4-isopropenylimidazole,
1-methyl-5-isopropenylimidazole,
2-isopropenylpyridine,
3-isopropenylpyridine,
4-isopropenylpyridine,
2-isopropenylquinoline,
3-isopropenylquinoline,
4-isopropenyquinoline.

Examples of the compound represented by the formula (2) in which $R^{21}$ is a vinyl group, n is 0, and A is a nitrogen-containing aromatic heterocyclic group include the following compounds.
1-methyl-2-(1-methylene-2-propenyl)imidazole,
1-methyl-4-(1-methylene-2-propenyl)imidazole,
1-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline,
4-(1-methylene-2-propenyl)quinoline.

Examples of the compound represented by the formula (2) in which $R^{21}$ is a vinyl group, n is 1, $R^{22}$ is an alkylene group, and A is a nitrogen-containing aromatic heterocyclic group include the following compounds.
Compounds in which $R^{22}$ is a methylene group:
1-methyl-2-(2-methylene-3-butenyl)imidazole,
1-methyl-4-(2-methylene-3-butenyl)imidazole,
1-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline,
4-(2-methylene-3-butenyl)quinoline.
Compounds in which $R^{22}$ is an ethylene group:
1-methyl-2-(3-methylene-4-pentenyl)imidazole,
1-methyl-4-(3-methylene-4-pentenyl)imidazole,
1-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline,
4-(3-methylene-4-pentenyl)quinoline.

The compound represented by the formula (2) is preferably a compound in which $R^{21}$ is a hydrogen atom, n is 1, and $R^{22}$ is a group represented by the formula (2-Y), and A is a substituted amino group. More preferable is a compound in which $R^{21}$ is a hydrogen atom, n is 1, $R^{22}$ is a group represented by the formula (2-Y), and A is a group represented by the formula (2-X). Further preferable is a compound in which $R^{23}$ and $R^{24}$ in the formula (2-X) are linear alkyl groups having 1 to 2 carbon atoms, a compound in which $R^{23}$ and $R^{24}$ in the formula (2-X) are trimethylsilyl groups, or a compound in which $R^{23}$ and $R^{24}$ in the formula (2-X) are bonded to form a group, and the group is a polymethylene group having 4 to 6 carbon atoms.

The compound represented by the formula (2) is particularly preferably
4-N,N-bis(trimethylsilyl)aminostyrene,
3-N,N-bis(trimethylsilyl)aminostyrene,
4-N,N-dimethylaminomethylstyrene,
3-N,N-dimethylaminomethylstyrene,
4-(1-pyrrolidinyl)ethylstyrene,
3-(1-pyrrolidinyl)ethylstyrene.

The content of the monomer unit based on a compound represented by the formula (1) is preferably 0.01% by weight or more, more preferably 0.02% by weight or more, further preferably 0.05% by weight or more per 100% by weight of the conjugated diene-based polymer, in order to enhance fuel cost-saving properties. The content is preferably 20% by weight or less, more preferably 2% by weight or less, further preferably 1% by weight or less, particularly preferably 0.5% by weight or less, in order to enhance economic efficiency and to increase tensile elongation at break.

In addition, in the monomer unit based on a compound represented by the formula (1), groups represented by $X^1$, $X^2$ and $X^3$ may have been converted into hydroxyl groups by hydrolysis, etc.

The content of the monomer unit based on a compound represented by the formula (2) is preferably 0.01% by weight or more, more preferably 0.02% by weight or more, further preferably 0.05% by weight or more per 100% by weight of the conjugated diene-based polymer, in order to enhance fuel cost-saving properties and to increase tensile elongation at break. The content is preferably 20% by weight or less, more preferably 2% by weight or less, further preferably 1% by weight or less, particularly preferably 0.5% by weight or less, in order to enhance economic efficiency and to increase tensile elongation at break.

It is preferable that the conjugated diene-based polymer of the present invention has a constituent unit based on vinyl aromatic hydrocarbon (vinyl aromatic hydrocarbon unit) in order to enhance strength. Examples of the vinyl aromatic hydrocarbon include styrene, α-methylstyrene, vinyltoluene, vinylnaphthalene, divinylbenzene, trivinylbenzene, and divinylnaphthalene. Preferable is styrene.

The content of the vinyl aromatic hydrocarbon unit is 0% by weight or more (the content of the conjugated diene unit is 100% by weight or less), preferably 10% by weight or more (the content of the conjugated diene unit is 90% by weight or less), more preferably 15% by weight or more (the content of the conjugated diene unit is 85% by weight or less), relative to the total amount of 100% by weight of the conjugated diene unit and the vinyl aromatic hydrocarbon unit. In order to enhance fuel cost-saving properties, the content of the vinyl aromatic hydrocarbon unit is preferably 50% by weight or less (the content of the conjugated diene unit is 50% by weight or more), more preferably 45% by weight or less (the content of the conjugated diene unit is 55% by weight or more).

The Mooney viscosity ($ML_{1+4}$) of the conjugated diene-based polymer of the present invention is preferably 10 or more, more preferably 20 or more, in order to enhance strength. In order to enhance processability, the Mooney viscosity is preferably 200 or less, more preferably 150 or less. The Mooney viscosity ($ML_{1+4}$) is measured at 100° C. according to JIS K6300 (1994).

The vinyl bonding amount of the conjugated diene-based polymer of the present invention is preferably 80 mol % or less, more preferably 70 mol % or less, relative to the content of 100 mol % of the conjugated diene unit, in order to enhance fuel cost-saving properties. In order to enhance gripping properties, the vinyl bonding amount is preferably 10 mol % or more, more preferably 15 mol % or more, further preferably 20 mol % or more, particularly preferably 40 mol % or more. The vinyl bonding amount is obtained by absorption intensity at around 910 $cm^{-1}$, which is an absorption peak of a vinyl group, using infrared spectrometry.

The molecular weight distribution of the conjugated diene-based polymer of the present invention is preferably 1 to 5, more preferably 1 to 2, in order to enhance fuel cost-saving properties. The molecular weight distribution is obtained by measuring the number average molecular weight (Mn) and the weight average molecular weight (Mw) using a gel permeation chromatography (GPC) method, and dividing Mw by Mn.

Examples of the preferable process for producing the conjugated diene-based polymer of the present invention include a process of polymerizing a monomer component containing a conjugated diene, a monomer represented by the above formula (1) and a monomer represented by the above formula (2) with an alkali metal catalyst in a hydrocarbon solvent.

Examples of the alkali metal catalyst include an alkali metal, an organic alkali metal compound, a complex of an alkali metal and a polar compound, and an oligomer having an alkali metal. Examples of the alkali metal include lithium, sodium potassium, rubidium, and cesium. Examples of the organic alkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. In addition, examples of the complex of an alkali metal and a polar compound include a potassium-tetrahydrofuran complex and a potassium-diethoxyethane complex, and examples of the oligomer having an alkali metal include a sodium salt of an α-methylstyrene tetramer. Preferable is an organic lithium compound or an organic sodium compound, more preferable is an organic lithium compound having 2 to 20 carbon atoms or an organic sodium compound having 2 to 20 carbon atoms.

The hydrocarbon solvent is a solvent which does not inactivate an organic alkali metal compound catalyst, and examples thereof include aliphatic hydrocarbon, aromatic hydrocarbon and alicyclic hydrocarbon. Examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. In addition, examples of the aromatic hydrocarbon include benzene, toluene, xylene, and ethylbenzene, and examples of the alicyclic hydrocarbon include cyclopentane, and cyclohexane. One or more kinds thereof are used, and the hydrocarbon solvent may be a mixture of various components, such as industrial hexane. Preferable is hydrocarbon having 2 to 12 carbon atoms.

A monomer component containing a conjugated diene, a compound represented by the above formula (1) and a compound represented by the above formula (2) is polymerized with an alkali metal catalyst in a hydrocarbon solvent to produce a polymer having a monomer unit based on the conjugated diene, a monomer unit based on the compound represented by the above formula (1) and a monomer unit based on the compound represented by the above formula (2). Examples of the conjugated diene include 1,3-butadiene, isoprene, 1,3-pentadiene, 2,3-dimethyl-1,3-butadiene, and 1,3-hexadiene. One or more kinds thereof are used. Preferable is 1,3-butadiene or isoprene.

The amount of the compound represented by the formula (1) used is preferably 0.01% by weight or more, more preferably 0.02% by weight or more, further preferably 0.05% by weight or more, relative to the total amount of 100% by weight of the monomer components used in the polymerization, in order to enhance fuel cost-saving properties. In order to enhance economic efficiency and to increase tensile elongation at break, the amount used is preferably 20% by weight or less, more preferably 2% by weight or less, further preferably 1% by weight or less, particularly preferably 0.5% by weight or less.

The amount of the compound represented by the formula (2) used is preferably 0.01% by weight or more, more preferably 0.02% by weight or more, further preferably 0.05% by weight or more, relative to the total amount of 100% by weight of the monomer components used in the polymerization, in order to enhance fuel cost-saving properties and to increase tensile elongation at break. In order to enhance economic efficiency and to increase tensile elongation at break, the amount used is preferably 20% by weight or less, more preferably 2% by weight or less, further preferably 1% by weight or less, particularly preferably 0.5% by weight or less.

The polymerization may be performed by combining vinyl aromatic hydrocarbon with the conjugated diene, the compound represented by the formula (1) and the compound represented by the formula (2), and examples of the vinyl aromatic hydrocarbon include styrene, α-methylstyrene, vinyltoluene, vinylnaphthalene, divinylbenzene, trivinylbenzene, and divinylnaphthalene. Preferable is styrene.

The amount of the vinyl aromatic hydrocarbon used is 0% by weight or more (the amount of the conjugated diene used is 100% by weight or less), and in order to enhance strength, the amount is preferably 10% by weight or more (the amount of the conjugated diene used is 90% by weight or less), more preferably 15% by weight or more (the amount of the conjugated diene used is 85% by weight or less), relative to the total amount of 100% by weight of the conjugated diene and the vinyl aromatic hydrocarbon used. In order to enhance fuel cost-saving properties, the amount of the vinyl aromatic hydrocarbon used is preferably 50% by weight or less (the amount of the conjugated diene used is 50% by weight or more), more preferably 45% by weight or less (the amount of the conjugated diene used is 55% by weight or more).

In addition, the total amount of the conjugated diene, the compound represented by the formula (1), the compound represented by the formula (2) and the vinyl aromatic hydrocarbon used in the polymerization reaction is preferably 99.9% by weight or more, more preferably 99.95% by weight or more, further preferably 100% by weight, relative to the total amount of 100% by weight of the monomers used, in order to enhance strength.

The polymerization reaction may be performed in the presence of an agent which adjusts the vinyl bonding amount of the conjugated diene unit, or an agent which adjusts the distribution of the conjugated diene unit and a monomer unit based on monomers other than the conjugated diene in the conjugated diene-based polymer chain (hereinafter, collectively referred to as "adjusting agent"). Examples of such agents include an ether compound, a tertiary amine, and a phosphine compound. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; aromatic ethers such as diphenyl ether and anisole. Examples of the tertiary amine include triethylamine, tripropylamine, tributylamine, N,N, N'—N'-tetramethylethylenediamine, N,N-diethylaniline, pyridine, and quinoline. In addition, examples of the phosphine compound include trimethylphosphine, triethylphosphine, and triphenylphosphine. One or more kinds thereof are used.

The polymerization temperature is usually 25 to 100° C., preferably 35 to 90° C. Further preferably 50 to 80° C. The polymerization time is usually 10 minutes to 5 hours.

In the production process of the present invention, if necessary, from the polymerization initiation to polymerization termination of the monomer with an alkali metal catalyst, a coupling agent may be added to a hydrocarbon solution of the conjugated diene-based polymer. Examples of the coupling agent include a compound represented by the following formula (3).

$$R^{31}{}_a ML_{4-a} \qquad (3)$$

wherein $R^{31}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agent represented by the formula (3) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent added is preferably 0.03 mol or more, more preferably 0.05 mol or more per 1 mol of an alkali metal derived from an alkali metal catalyst, in order to enhance the processability of the conjugated diene-based polymer. In order to enhance fuel cost-saving properties, the amount is preferably 0.4 mol or less, more preferably 0.3 mol or less.

The conjugated diene-based polymer can be recovered from a hydrocarbon solution of the conjugated diene-based polymer by a publicly-known recovery method, for example, (1) a method of adding a coagulating agent to the hydrocarbon solution of the conjugated diene-based polymer, or (2) a method of adding steam to the hydrocarbon solution of the conjugated diene-based polymer. The recovered conjugated diene-based polymer may be dried with a publicly-known dryer such as a band dryer or an extrusion-type dryer.

The conjugated diene-based polymer of the present invention can be incorporated into other polymer components, additives, etc., and used as a conjugated diene-polymer composition.

Examples of the other polymer components include conventional styrene-butadiene copolymer rubber, polybutadiene rubber, butadiene-isoprene copolymer rubber, and butyl rubber. In addition, examples thereof include natural rubber, an ethylene-propylene copolymer and an ethylene-octene copolymer. One or more kinds of these polymer components are used.

When the other polymer components are incorporated into the conjugated diene-based polymer of the present invention, the amount of the conjugated diene-based polymer of the present invention incorporated is preferably 10% by weight or more, more preferably 20% by weight or more, relative to the total amount of 100% by weight of the polymer components (including the amount of the conjugated diene-based polymer incorporated) incorporated, in order to enhance fuel cost-saving properties.

As the additives, publicly-known additives can be used, and examples thereof include vulcanizing agents such as sulfur; vulcanization accelerators such as a thiazole-based vulcanization accelerator, a thiuram-based vulcanization accelerator, a sulfenamide-based vulcanization accelerator, and a guanidine-based vulcanization accelerator; vulcanization activating agents such as stearic acid and zinc oxide; organic peroxides such as dicumyl peroxide and ditertiary butyl peroxide; reinforcing agents such as silica and carbon black; fillers such as calcium carbonate, talc, alumina, clay, aluminum hydroxide, and mica; silane coupling agents; extender oils; processing aids; anti-aging agents; lubricants.

Examples of the sulfur include powdery sulfur, precipitated sulfur, colloidal sulfur, insoluble sulfur and high dispersing sulfur. The amount of the sulfur incorporated is preferably 0.1 to 15 parts by weight, more preferably 0.3 to 10 parts by weight, further preferably 0.5 to 5 parts by weight per 100 parts by weight of the polymer component.

Examples of the vulcanization accelerator include thiazole-based vulcanization accelerators such as 2-mercaptobenzothiazole, dibenzothiazyl disulfide, and N-cyclohexyl-2-benzothiazyl sulfenamide; thiuram-based vulcanization accelerators such as tetramethylthiuram monosulfide and tetramethylthiuram disulfide; sulfenamide-based vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide, and N,N'-diisopropyl-2-benzothiazole sulfenamide; guanidine-based vulcanization accelerators such as diphenylguanidine, diorthotolylguanidine, and orthotolylbiguanidine. The amount of the vulcanization accelerator incorporated is preferably 0.1 to 5 parts by weight, more preferably 0.2 to 3 parts by weight per 100 parts by weight of the polymer component.

Examples of the silica include dry silica (anhydrous silicic acid), wet silica (hydrous silicic acid), colloidal silica, precipitated silica, calcium silicate, and aluminum silicate. One or more kinds thereof can be used. The BET specific surface area of the silica is preferably 50 to 250 m²/g. The BET specific surface area is measured according to ASTM D1993-03. As commercially available products, trade name Ultrasil® VN3-G manufactured by Degussa, trade name VN3®, AQ, ER, RS-150 manufactured by Tosoh Silica Corporation, trade name Zeosil® 1115 MP, 1165 MP manufactured by Rhodia, etc., can be used.

Examples of the carbon black include furnace black, acetylene black, thermal black, channel black, and graphite. Examples of the carbon black include channel carbon black such as EPC, MPC and CC; furnace carbon black such as SAF, ISAF, HAF, MAF, FEF, SRF, GPF, APF, FF, CF, SCF and ECF; thermal carbon black such as FT and MT; acetylene carbon black. One or more kinds thereof can be used.

The nitrogen adsorption specific surface area ($N_2SA$) of carbon black is preferably 5 to 200 m²/g, and the dibutyl phthalate (DBP) absorption amount of carbon black is preferably 5 to 300 ml/100 g. The nitrogen adsorption specific surface area is measured according to ASTM D4820-93, and the DBP absorption amount is measured according to ASTM D2414-93. As commercially available products, trade name Dia Black® N339 manufactured by Mitsubishi Chemical Corporation, trade name Seast® 6, Seast® 7HM, Seast® KH manufactured by Tokai Carbon Co., Ltd., trade name CK® 3, Special Black® 4A manufactured by Degussa, etc., can be used.

When a conjugated diene-based polymer composition in which a reinforcing agent is incorporated into the conjugated diene-based polymer of the present invention is used, the amount of the reinforcing agent incorporated is preferably 10 to 150 parts by weight per 100 parts by weight of the amount of the conjugated diene-based polymer of the present invention incorporated. In order to enhance abrasion resistance and strength, the amount incorporated is more preferably 20 parts by weight or more, further preferably 30 parts by weight or more. In order to enhance reinforcing properties, the amount is more preferably 120 parts by weight or less, further preferably 100 parts by weight or less.

When the conjugated diene-based polymer composition in which a reinforcing agent is incorporated into the conjugated diene-based polymer of the present invention is used, in order to enhance fuel cost-saving properties, it is preferable that silica is used as the reinforcing agent. The amount of the silica incorporated is preferably 50 parts by weight or more, more preferably 70 parts by weight or more, relative to the total amount of 100 parts by weight of the reinforcing agent incorporated.

In addition, it is preferable that the weight ratio of the content of the silica used as the reinforcing agent and the content of carbon black (content of silica:content of carbon black) is 2:1 to 50:1. It is more preferable that the weight ratio is 5:1 to 20:1 in order to enhance fuel cost-saving properties and to enhance reinforcing properties.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One or more kinds thereof are used. As commercially available products, trade name Si69®, Si75® manufactured by Degussa, etc., can be used.

When a conjugated diene-based polymer composition in which a silane coupling agent is incorporated into the conjugated diene-based polymer of the present invention is used, the amount of the silane coupling agent incorporated is preferably 1 to 20 parts by weight, more preferably 2 to 15 parts by weight, further preferably 5 to 10 parts by weight per 100 parts by weight of the silica.

Examples of the extender oils include an aromatic mineral oil (viscosity specific gravity constant (V.G.C. value) 0.900 to 1.049), a naphthene mineral oil (V.G.C. value 0.850 to 0.899), and a paraffin mineral oil (V.G.C. value 0.790 to 0.849). The polycyclic aromatic content of the extender oils is preferably less than 3% by weight, more preferably less than 1% by weight. The polycyclic aromatic content is measured according to the United Kingdom Petroleum Industry Association 346/92 method. In addition, the content of aromatic compound (CA) of the extender oils is preferably 20% by weight or more. One or more kinds of these extender oils are used.

As a method of incorporating the other polymer components or additives into the conjugated diene-based polymer of the present invention to produce a conjugated diene-based polymer composition, a publicly-known method, for example, a method of kneading each component with a publicly-known mixer such as a roll mixer or Bambury mixer can be used.

As kneading conditions, when additives other than the vulcanizing agent and the vulcanization accelerator are incorporated, the kneading temperature is usually 50 to 200° C., preferably 80 to 190° C., and the kneading time is usually 30 seconds to 30 minutes, preferably 1 minute to 30 minutes. When the vulcanizing agent and the vulcanization accelerator are incorporated, the kneading temperature is usually 100° C. or lower, preferably room temperature to 80° C. In addition, a composition in which the vulcanizing agent and the vulcanization accelerator are incorporated is usually subjected to vulcanization treatment such as press vulcanization for use. The vulcanization temperature is usually 120 to 200° C., preferably 140 to 180° C.

The conjugated diene-based polymer composition of the present invention is excellent in fuel cost-saving properties. In addition, the conjugated diene-based polymer composition of the present invention has high tensile elongation at break, and is excellent in destruction resistance.

The conjugated diene-based polymer and conjugated diene-based polymer composition of the present invention are used in tires, soles, floor materials, and vibration prevention materials and, particularly, are suitably used in tires.

EXAMPLES

The present invention will be described below by way of Examples.

The evaluation of physical properties was performed by the following methods.

1. Mooney Viscosity ($ML_{1+4}$)

The Mooney viscosity of a polymer was measured at 100° C. according to JIS K6300 (1994).

2. Vinyl Bonding Amount (Unit: Mol %)

The vinyl bonding amount of a polymer was obtained by absorption intensity at around 910 cm$^{-1}$, which is an absorption peak of a vinyl group, using infrared spectrometry.

3. Content of Styrene Unit (Unit: Wt %)

The content of a styrene unit of a polymer was obtained from a refractive index according to JIS K6383 (1995).

4. Molecular Weight Distribution (Mw/Mn)

The weight average molecular weight (Mw) and the number average molecular weight (Mn) were measured by a gel permeation chromatography (GPC) method under the following conditions (1) to (8), and the molecular weight distribution (Mw/Mn) of a polymer was obtained.
(1) Apparatus: HLC-8220 manufactured by Tosoh Corporation
(2) Separation column: HM-H manufactured by Tosoh Corporation (two in series)
(3) Measurement temperature: 40° C.
(4) Carrier: tetrahydrofuran
(5) Flow rate: 0.6 mL/minute
(6) Injection amount: 5
(7) Detector: differential refractive index
(8) Molecular weight standard: standard polystyrene 5. Fuel Cost-Saving Properties From a sheet-like vulcanization molded body, a strip-like test piece having a width of 1 mm or 2 mm and a length of 40 mm was punched out and subjected to a test. For measurements, loss tangent (tan δ(70° C.)) of a test piece at a temperature of 70° C. was measured with a viscoelasticity measuring apparatus (manufactured by Ueshima Seisakusho Co., Ltd.) under the conditions of a strain of 1% and a frequency of 10 Hz. As this value is smaller, fuel cost-saving properties are more excellent.

6. Elongation at Break (EB, Unit: %)

Using a No. 3-shaped dumbbell test piece, elongation at which the test piece is broken was measured at a tensile rate of 500 mm/minute according to JIS K6251.

Example 1

The interior of a polymerization reactor made of stainless steel equipped with a stirring device having an internal volume of 5 L was washed, dried and replaced with dry nitrogen. Then, 2.55 kg of industrial hexane (density 680 kg/m$^3$), 137 g of 1,3-butadiene, 43 g of styrene, 0.53 g of a mixture of 3-(1-pyrrolidinyl)ethylstyrene and 4-(1-pyrrolidinyl)ethylstyrene, 1.52 ml of tetrahydrofuran, and 1.18 ml of ethylene glycol diethyl ether were placed into the polymerization reactor. Then, 0.64 g of bis(diethylamino)methylvinylsilane and a solution of n-butyllithium in n-hexane (content of n-butyllithium 3.98 mmol) were placed into the polymerization reactor, and a polymerization reaction was initiated.

The copolymerization reaction of 1,3-butadiene, styrene, bis(diethylamino)methylvinylsilane, 3-(1-pyrrolidinyl)ethylstyrene, and 4-(1-pyrrolidinyl)ethylstyrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g and the amount of styrene supplied was 65 g. In the total amount of monomers which were placed and supplied into the polymerization reactor, the amount of the mixture of 3-(1-pyrrolidinyl)ethylstyrene and 4-(1-pyrrolidinyl)ethylstyrene placed was 0.12% by weight, and the amount of bis(diethylamino)methylvinylsilane placed was 0.14% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69® manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name; Soxinol® D, manufacture by Sumitomo Chemical Co., Ltd), 1.5 parts by weight of a wax (trade name: Sunnoc® N, manufactured by Ouchi Shiko Chemical Industrial Co., Ltd.), and 1.4 parts by weigh of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 1

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 1.81 g of a mixture of 3-(1-pyrrolidinyl)ethylstyrene and 4-(1-pyrrolidinyl)ethylstyrene, 1.52 ml of tetrahydrofuran, and 1.18 ml of ethylene glycol diethyl ether were placed into the polymerization reactor. Then, 3.81 mmol of n-butyllithium was placed as a n-hexane solution into the polymerization reactor, and a polymerization reaction was initiated.

The copolymerization reaction of 1,3-butadiene, styrene, 3-(1-pyrrolidinyl)ethylstyrene, and 4-(1-pyrrolidinyl)ethylstyrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g and the amount of styrene supplied was 65 g. In the total amount of monomers which were placed and supplied into the polymerization reactor, the amount of the mixture of 3-(1-pyrrolidinyl)ethylstyrene and 4-(1-pyrrolidinyl)ethylstyrene placed was 0.40% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shiko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 2

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 0.53 g of a mixture of 3-(1-pyrrolidinyl)ethylstyrene and 4-(1-pyrrolidinyl)ethylstyrene, 1.52 ml of tetrahydrofuran, and 1.18 ml of ethylene glycol diethyl ether were placed into the polymerization reactor. Then, 3.73 mmol of n-butyllithium was placed as a n-hexane solution into the polymerization reactor, and a polymerization reaction was initiated.

The copolymerization reaction of 1,3-butadiene, styrene, 3-(1-pyrrolidinyl)ethylstyrene, and 4-(1-pyrrolidinyl)ethylstyrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g and the amount of styrene supplied was 65 g. In the total amount of monomers which were placed and supplied into the polymerization reactor, the amount of the mixture of 3-(1-pyrrolidinyl)ethylstyrene and 4-(1-pyrrolidinyl)ethylstyrene placed was 0.12% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shiko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 3

A polymerization reactor made of stainless steel equipped with a stirring device having an internal volume of 20 L was washed, dried and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.0 ml of ethylene glycol diethyl ether were placed into the polymerization reactor. Then, 5.43 g of bis(diethylamino)methylvinylsilane and a solution of n-butyllithium in n-hexane (content of n-butyllithium 14.72 mmol) were placed into the polymerization reactor, and a polymerization reaction was initiated.

The copolymerization reaction of 1,3-butadiene, styrene, and bis(diethylamino)methylvinylsilane was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g and the amount of styrene supplied was 288 g. In the total amount of monomers which were placed and supplied into the polymerization reactor, the amount of bis(diethylamino)methylvinylsilane placed was 0.27% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinole® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Example 2

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 0.43 g of 4-dimethylaminomethylstyrene, 1.52 ml of tetrahydrofuran, and 1.18 ml of ethylene glycol diethyl ether were placed into the polymerization reactor. Then, 0.64 g of bis(diethylamino)methylvinylsilane and a solution of n-butyllithium in n-hexane (content of n-butyllithium 3.59 mmol) were placed into the polymerization reactor, and a polymerization reaction was initiated.

The copolymerization reaction of 1,3-butadiene, styrene, bis(diethylamino)methylvinylsilane, and 4-dimethylaminomethylstyrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g and the amount of styrene supplied was 65 g. In the total amount of monomers which were placed and supplied into the polymerization reactor, the amount of 4-dimethylaminomethylstyrene placed was 0.10% by weight, and the amount of bis(diethylamino)methylvinylsilane placed was 0.14% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Comparative Example 4

A polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 2.04 g of 4-dimethylaminomethylstyrene, 6.1 ml of tetrahydrofuran, and 4.0 ml of ethylene glycol diethyl ether were placed into the polymerization reactor. Then, 15.89 mmol of n-butyllithium was placed as a n-hexane solution into the polymerization reactor, and a polymerization reaction was initiated.

The copolymerization reaction of 1,3-butadiene, styrene and 4-dimethylaminomethylstyrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g and the amount of styrene supplied was 288 g. In the total amount of monomers which were placed and supplied into the polymerization reactor, the amount of 4-dimethylaminomethylstyrene placed was 0.10% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Example 3

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 0.70 g of 4-bis(trimethylsilyl)aminostyrene, 1.52 ml of tetrahydrofuran, and 1.18 ml of ethylene glycol diethyl ether were placed into the polymerization reactor. Then, 0.64 g of bis(diethylamino)methylvinylsilane and a solution of n-butyllithium in n-hexane (content of n-butyllithium 3.66 mmol) were placed into the polymerization reactor, and a polymerization reaction was initiated.

The copolymerization reaction of 1,3-butadiene, styrene, bis(diethylamino)methylvinylsilane, and 4-bis(trimethylsilyl)aminostyrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g and the amount of styrene supplied was 65 g. In the total amount of monomers which were placed and supplied into the polymerization reactor, the amount of 4-bis(trimethylsilyl)aminostyrene placed was 0.16% by weight, and the amount of bis(diethylamino)methylvinylsilane placed was 0.14% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 3.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol®CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

Comparative Example 5

The interior of a polymerization reactor made of stainless steel equipped with a stirring device having an internal volume of 5 L was washed, dried and replaced with dry nitrogen. Then, 2.55 kg of industrial hexane (density 680 kg/m$^3$), 137 g of 1,3-butadiene, 43 g of styrene, 1.52 ml of tetrahydrofuran, 1.18 ml of ethylene glycol diethyl ether, and 0.70 g of 4-bis(trimethylsilyl)aminostyrene were placed into the polymerization reactor. Then, 3.81 mmol of n-butyllithium was placed as a n-hexane solution into the polymerization reactor, and a polymerization reaction was initiated.

The copolymerization reaction of 1,3-butadiene, styrene, and 4-bis(trimethylsilyl)aminostyrene was performed for 2 hours at a stirring rate of 130 rpm and a temperature in the polymerization reactor of 65° C. while 1,3-butadiene and styrene were continuously supplied. The amount of 1,3-butadiene supplied was 205 g and the amount of styrene supplied was 65 g. In the total amount of monomers which were placed and supplied into the polymerization reactor, the amount of 4-bis(trimethylsilyl)aminostyrene placed was 0.16% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.) and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 3.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

TABLE 1

|  |  | Example 1 | Comparative Example 1 | Comparative Example 2 | Comparative Example 3 |
|---|---|---|---|---|---|
| Mooney viscosity | — | 53.0 | 38.9 | 40.7 | 45.3 |
| Vinyl binding amount | mol % | 58.7 | 58.2 | 58.5 | 57.4 |
| Content of styrene unit | wt % | 24.1 | 24.5 | 23.9 | 24.1 |
| Molecular weight distribution | — | 1.11 | 1.13 | 1.09 | 1.06 |
| Fuel cost-saving properties tanδ (70° C.) | — | 0.130 | 0.194 | 0.199 | 0.124 |
| Elongation at break | % | 410 | 450 | 460 | 320 |

TABLE 2

|  |  | Example 2 | Comparative Example 4 |
|---|---|---|---|
| Mooney viscosity | — | 50.6 | 39.0 |
| Vinyl binding amount | mol % | 59.0 | 55.5 |
| Content of styrene unit | wt % | 24.3 | 24.5 |
| Molecular weight distribution | — | 1.09 | 1.06 |
| Fuel cost-saving properties tanδ (70° C.) | — | 0.135 | 0.216 |
| Elongation at break | % | 400 | 420 |

TABLE 3

|  |  | Example 3 | Comparative Example 5 |
|---|---|---|---|
| Mooney viscosity | — | 54.0 | 50.0 |
| Vinyl binding amount | mol % | 59.3 | 58.6 |
| Content of styrene unit | wt % | 22.4 | 23.5 |
| Molecular weight distribution | — | 1.10 | 1.09 |
| Fuel cost-saving properties tanδ (70° C.) | — | 0.130 | 0.188 |
| Elongation at break | % | 390 | 355 |

What is claimed is:

1. A conjugated diene-based polymer having a monomer unit based on a conjugated diene, a monomer unit based on a compound represented by the following formula (1) and a monomer unit based on a compound represented by the following formula (2);

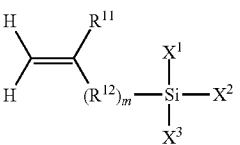

(1)

wherein $R^{11}$ represents a hydrogen atom or a hydrocarbyl group, m is an integer of 0 or 1, $R^{12}$ represents a hydrocarbylene group, and $X^1$, $X^2$ and $X^3$ each independently represent a substituted amino group, or a hydrocarbyl group optionally having a substituent, provided that at least one of $X^1$, $X^2$ and $X^3$ is a substituted amino group;

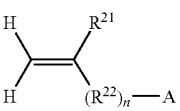

(2)

wherein $R^{21}$ represents a hydrogen atom or a hydrocarbyl group, n is an integer of 0 or 1, $R^{22}$ represents a hydrocarbylene group, and A represents a substituted amino group, or a nitrogen-containing heterocyclic group.

2. The conjugated diene-based polymer according to claim 1, wherein m in the formula (1) is 0.

3. The conjugated diene-based polymer according to claim 1, wherein $R^{21}$ in the formula (2) is a hydrogen atom, n is 1, $R^{22}$ is a group represented by the following formula (2-Y), and A is a substituted amino group;

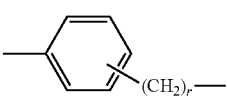

(2-Y)

wherein r is an integer of 0 to 5 and, when r is an integer of 1 to 5, $(CH_2)_r$ is a substituent on a benzene ring, and $(CH_2)_r$ bonds to A and, when r is 0, $(CH_2)_r$ represents a bond between a benzene ring and A.

4. The conjugated diene-based polymer according to claim 1, wherein the vinyl bonding amount of the conjugated diene-based polymer is 20 mol % or more and 70 mol % or less, relative to the content of 100 mol % of a monomer unit based on a conjugated diene.

5. The conjugated diene-based polymer according to claim 1, wherein the content of a monomer unit based on a compound represented by the formula (1) is 0.01 to 20% by weight, and the content of a monomer unit based on a compound represented by the formula (2) is 0.01 to 20% by weight, relative to 100% by weight of the conjugated diene-based polymer.

6. A conjugated diene-based polymer composition comprising the conjugated diene-based polymer according to claim 1 and a reinforcing agent, wherein the content of the reinforcing agent is 10 to 150 parts by weight per 100 parts by weight of the conjugated diene-based polymer.

7. The conjugated diene-based polymer composition according to claim 6, wherein the composition comprises silica and carbon black as the reinforcing agent, and the weight ratio of the content of silica to the content of carbon black (content of silica:content of carbon black) is 2:1 to 50:1.

8. A process for producing a conjugated diene-based polymer comprising polymerizing a monomer component containing a conjugated diene, a compound represented by the following formula (1) and a compound represented by the following formula (2) with an alkali metal catalyst in a hydrocarbon solvent;

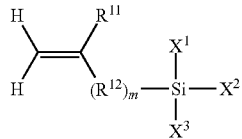 (1)

wherein $R^{11}$ represents a hydrogen atom or a hydrocarbyl group, m is 0 or 1, $R^{12}$ represents a hydrocarbylene group, and $X^1$, $X^2$ and $X^3$ each independently represent a substituted amino group, or a hydrocarbyl group optionally having a substituent, provided that at least one of $X^1$, $X^2$ and $X^3$ is a substituted amino group;

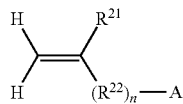 (2)

wherein $R^{21}$ represents a hydrogen atom or a hydrocarbyl group, n is 0 or 1, $R^{22}$ represents a hydrocarbylene group, and A represents a substituted amino group, or a nitrogen-containing heterocyclic group.

9. The process for producing a conjugated diene-based polymer according to claim 8, wherein $R^{11}$ in the formula (1) is a hydrogen atom and m in the formula (1) is 0.

10. The process for producing a conjugated diene-based polymer according to claim 8, wherein $R^{21}$ in the formula (2) is a hydrogen atom, n is 1, $R^{22}$ is a group represented by the following formula (2-Y), and A is a substituted amino group;

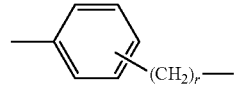 (2-Y)

wherein r is an integer of 0 to 5 and, when r is an integer of 1 to 5, $(CH_2)_r$ is a substituent on a benzene ring, and $(CH_2)_r$ bonds to A and, when r is 0, $(CH_2)_r$ represents a bond between a benzene ring and A.

* * * * *